United States Patent [19]

Sasajima et al.

[11] 4,434,251

[45] Feb. 28, 1984

[54] CROSS-LINKED POLYVINYL CHLORIDE RESIN FOAM AND METHOD OF MANUFACTURING THE SAME

[75] Inventors: Junnosuke Sasajima; Hiroshi Nagai; Kenji Mogi, all of Hiratsuka; Akio Nojiri; Naonori Shiina, both of Tokyo, all of Japan

[73] Assignee: The Furukawa Electric Co., Ltd., Tokyo, Japan

[21] Appl. No.: 346,039

[22] PCT Filed: Jun. 4, 1981

[86] PCT No.: PCT/JP81/00128

§ 371 Date: Jan. 25, 1982

§ 102(e) Date: Jan. 25, 1982

[87] PCT Pub. No.: WO81/03461

PCT Pub. Date: Dec. 10, 1981

[30] Foreign Application Priority Data

Jun. 4, 1980 [JP] Japan .................................. 55-75144

[51] Int. Cl.$^3$ ............................ C08J 9/10; B01J 1/10; B29D 27/00
[52] U.S. Cl. ..................................... 521/75; 204/159.2; 204/159.17; 204/159.24; 264/25; 264/54; 264/DIG. 5; 264/DIG. 18; 521/73; 521/85; 521/91; 521/93; 521/140; 521/145; 521/915
[58] Field of Search ..................... 264/25, 54; 521/73, 521/145, 915, 75, 140; 204/159.2, 159.17, 159.24

[56] References Cited

U.S. PATENT DOCUMENTS 3,562,367  2/1971  Shinohara et al. .................... 264/25
4,203,815  5/1980  Noda et al. .......................... 521/145

*Primary Examiner*—Morton Foelak
*Attorney, Agent, or Firm*—Frishauf, Holtz, Goodman & Woodward

[57] ABSTRACT

This invention provides a method of continuously manufacturing a cross-linked polyvinyl chloride resin foam sheet which has a low density, uniformly fine cell, excellent thermal moldability and high heat resistance and is neither deformed nor deteriorated even by long storage characterized by uniformly kneading the polyvinyl chloride resin with a blowing agent, stabilizer, plasticizer and cross-linking promoter without causing the blowing agent to decompose itself, thereby providing an unfoamed kneaded composition in which the polyvinyl chloride resin is gelled and forming said composition into a continuing sheet, irradiating said sheet with ionizing radiation to cross-link the resin; and thermally foaming the cross-linked sheet.

12 Claims, No Drawings

CROSS-LINKED POLYVINYL CHLORIDE RESIN FOAM AND METHOD OF MANUFACTURING THE SAME

TECHNICAL FIELD

This invention relates to a cross-linked polyvinyl chloride resin foam having uniformly fine cellular structure with low density, which has high thermoformability and heat resistance, and, even after long storage, is neither deformed nor deteriorated, and also to a method of manufacturing said cross-linked polyvinyl chloride resin foam.

BACKGROUND ART

A polyvinyl chloride resin foam has the advantages that it excels in fire retardance, chemical resistance, weatherbility and waterproofness and can be applied at a relatively low temperature, but is handicapped by the drawback that it has low heat resistance. It is known that this difficulty can be resolved by developing a cross-linked polyvinyl chloride resin foam. To date, however, such cross-linked polyvinyl chloride resin foam is actually produced only by the so-called pressurized foaming process such as a high pressure foaming process using a pressure-resistant sealed metal mold or high pressure inert gas process, (set forth, for example, in the Japanese patent publication No. 22,370/64 and Japanese patent publication No. 12,632/66). These proposed processes are inevitably carried out by the batch system, failing to produce the intended foam continuously. To obtain a sheet of cross-linked polyvinyl chloride resin foam, therefore, it has been necessary to slice a batch-produced foam block into a thin sheet.

Consequently, the conventional method of manufacturing cross-linked polyvinyl chloride resin foam which is based on the pressurized foaming process has been accompanied with the drawbacks that said conventional method involves costly manufacturing equipment; is handicapped by low productivity; moreover has to take many steps including, for example, the slicing step; the product becomes unavoidably expensive; and its market still fails to be expanded due to competition by less expensive foamed products such as foamed polyurethane, foamed polystyrene and foamed polyethylene.

For a long time, therefore, studies have been conducted on the method of continuously manufacturing a cross-linked polyvinyl chloride resin foam. To date, however, no process has been proposed which proves fully successful from the practical point of view.

Though not clearly understood, the failure to develop the method of continuously manufacturing cross-linked polyvinyl chloride resin foam at a low cost is inferred from the experiments carried out by the present inventors which complete this invention to have resulted in determining the undermentioned facts. Polyvinyl chloride resin tends to be thermally decomposed by the heat during kneading or molding and give forth hydrogen chloride gas. To avoid this objectionable event, it is always necessary to blend a stabilizer with the polyvinyl chloride resin. Normally, the stabilizer is applied in an amount of about 2 to 5 PHR. Where it is attempted to mix a thermally decomposable blowing agent such as azodicarbonamide with polyvinyl chloride resin, plasticizer and stabilizer by a mixing roller or Banbury mixer, then said blowing agent vigorously decomposes itself even at a lower temperature than the normal decomposition temperature of said blowing agent and evolves gases, making it impossible to obtain a unfoamed polyvinyl chloride resin molding.

Namely, it is impossible to provide a polyvinyl chloride resin composition, whether cross-linked or not, in which a thermally decomposable blowing agent, stabilizer and plasticizer are uniformly blended and is once gelled, that is, a foamable polyvinyl chloride resin composition.

On the other hand, a soft polyvinyl chloride resin foam has been continuously produced by applying a thermally decomposable blowing agent as set forth, for example, in the Japanese patent publications Nos. 18,828/67 and 13,874/68. These proposed processes indeed make it possible to blend a thermally decomposable blowing agent with the polyvinyl chloride resin without giving rise to the premature decomposition of said blowing agent. However, these published processes are necessary to use extremely fine polyvinyl chloride resin powder or the so-called paste resin manufactured by the emulsion polymerization process. So long as the expensive paste resin is used, it is impossible to produce a cross-linked polyvinyl chloride resin foam which can compete with inexpensive foamed products such as polyurethane foam, polystyrene foam or polyethylene foam.

To attain the intended object, therefore, it is necessary to apply the ordinary inexpensive polyvinyl chloride resin which is produced in large quantities by the suspension polymerization process. Where, however, it is attempted to blend a stabilizer and thermally decomposable blowing agent with the ordinary polyvinyl chloride resin, then a serious difficulty arises that said thermally decomposable blowing agent undesirably decomposes itself during the blending process.

It is be understood that the above-mentioned fundamental problem has made it impossible to apply the ordinary inexpensive polyvinyl chloride resin in the manufacture of the conventional soft polyvinyl chloride resin foam, and made it indispensable to purposely use special expensive polyvinyl chloride resin powder, that is, paste resin. In this connection, it may be added that the paste resin normally remains in a state referred to as plastisol, is uniformly miscible with, for example, a blowing agent at a lower temperature than 100° C. without being heated to a gelling temperature, and therefore can be uniformly applied to the surface of a substrate (for example, a piece of fabric) in the form of a sheet. In contrast, the ordinary polyvinyl chloride resin can not be rendered uniformly miscible with a blowing agent, unless heated to a higher temperature than the gelling temperature of said resin. It is supposed, therefore, that an inexpensive cross-linked polyvinyl chloride resin foam available for pratical application has not been developed for the reason given above.

DESCRIPTION OF THE INVENTION

This invention has been accomplished as a result of intensive studies to resolve difficulties encountered in the present circumstances, and is intended to provide a cross-linked polyvinyl chloride resin foam having uniformly fine cellular structure with a low density and also a method of continuously manufacturing said foam from the ordinary inexpensive polyvinyl chloride resin under the normal pressure.

Namely, the invention is intended to provide a cross-linked polyvinyl chloride resin foam having such physical properties as density lower than 0.3 g/cm³, average cell diameter smaller than 500 microns and gel content ranging from 20 to 60%. The method of manufacturing said foam comprises:

the first step of forming into a desired shape a composition of polyvinyl chloride resin, plasticizer, stabilizer, cross-linking promotor and blowing agent, the composition having been at least once gelled;

the second step of irradiating ionizing radiation on the shaped mass for cross-linking; and the third step of thermally foaming the cross-linked mass.

Concrete description is now given of a method of manufacturing a cross-linked polyvinyl chloride resin foam embodying this invention. The first step of said manufacturing method may be carried out be either of the undermentioned two embodiments.

The first embodiment runs as follows. As previously mentioned, polyvinyl chloride resin is partly decomposed when heated for kneading or molding, evolving, for example, hydrogen chloride. It is therefore indispensable to blend a stabilizer with said resin in order to suppress the occurrence of such objectional event. Where, in this case, it is attempted to blend a thermally decomposable blowing agent, plasticizer, cross-linking promotor and stabilizer with the polyvinyl chloride resin, then the blowing agent vigorously decomposes itself even at a lower temperature than its normal decomposition temperature, thus failing to produce a polyvinyl chloride resin composition in which the above-listed additives are uniformly blended without giving rise to the decomposition of the blowing agent.

Studies have been conducted to define the cause leading to such objectionable event. It has been found as a result that where the thermally decomposable blowing agent is present with the stabilizer at one time of the above-mentioned blending, then the blowing agent is noticeably reduced in decomposition temperature and substantially decomposes itself at the gelling temperature of the polyvinyl chloride resin or at a lower level.

Therefore, the first step of the method of this invention comprises uniformly blending a plasticizer and stabilizer with the polyvinyl chloride resin at a higher temperature than the gelling temperature of said resin. This process allows for the uniform dispersion of the plasticizer, enabling the above-mentioned blending to be effected even at a lower level than the gelling temperature of said resin. Namely, the blended mass, once gelled, can be gelled at a lower temperature than that of the initial gelation due to the action of the plasticizer. Where, therefore, a blowing agent is added to the already blended mass at a more reduced temperature, then it is possible to obtain a composition in which the respective components are uniformly blended without giving rise to the decomposition of the blowing agent. This satisfactory event results from the fact that where stabilizer and blowing agent are first added together, then all the required components of the subject composition can be blended at a lower level than the normal decomposition temperature of the blowing agent. The cross-linking promotor may be added when the plasticizer and stabilizer are first blended with the polyvinyl chloride resin or later together with the blowing agent.

The reason why the polyvinyl chloride resin should be gelled when the stabilizer and plasticizer are blended with said resin is that if the blended components are kneaded together at a lower temperature than that which allows for the full gelation of the polyvinyl chloride resin and the kneaded mixture is shaped into, for example, a sheet by extrusion or by applying calender rolls, then said shaped sheet becomes brittle, and is readily broken when it is tried to take off said sheet from the fabricating device. The polyvinyl chloride resin should be gelled at least once in order to let a mass formed of said resin blended with the above-mentioned various components withstand a tensile force required to remove, for example, a sheet of the blended mass from the fabricating device by taking off or taking up during the actual manufacture. According to the method of this invention, therefore, the stabilizer and plasticizer are blended with the polyvinyl chloride resin at a higher temperature than the normal gelling temperature of said resin. Later, the blowing agent is added to the gelled mass containing the stabilizer. Therefore, for the above-mentioned reason, the gelled mass is not permitted to be heated to a higher level than the gelling temperature of the polyvinyl chloride resin.

As used herein, the term "polyvinyl chloride resin" is defined to mean a polymer of vinyl chloride and a copolymer consisting of more than 50% of vinyl chloride and vinyl acetate, vinylidene chloride or ethylene. For the object of this invention, it is possible to blend, for example, chlorinated polyethlene or ABS resin with the polyvinyl chloride resin or the above-mentioned copolymer of the vinyl chloride to such an extent that the content of the vinyl chloride does not fall below 50%. Most preferred, however, is polyvinyl chloride, whose average polymerization degree is desired to range between 700 and 2,500.

A plasticizer used in this invention well serves the purpose, if it can render the polyvinyl chloride resin fully plastic. The plasticizer includes, for example, phthalate esters, phosphate esters, epoxidized vegetable oil and nitrile series synthetic rubbers. Preferred are the phthalate esters whose addition is desired to range between 20 and 120 PHR (parts by weight per hundred parts of resin). Where the content of the plasticizer falls below 20 PHR, then the resultant polyvinyl chloride resin decreases in workability, presenting difficulties in the kneading and shaping of said resin. Conversely where the content of the plasticizer rises above 120 PHR, then the resultant polyvinyl chloride is reduced in mechanical strength.

A stabilizer used in this invention is defined to be the type which helps to stabilize the polyvinyl chloride resin. The stabilizer includes, for example, the lead series, metallic soap series, epoxy series, and organic tin series. The preferred types of the stabilizer are the lead series and metallic soap series, whose addition is chosen to be larger than 0.5 PHR.

A blowing agent used in this invention is chosen to be the type which is thermally decomposed to evolve gas. The blowing agent includes, for example, azodicarbonamide, dinitrosopentamethylene tetramine and pp'-oxy-bis-benzene sulfonyl hydrazide. Most preferred among these blowing agents is azodicarboamide, which has a high decomposition temperature, can generate a large amount of gas and is free from the danger of explosion.

A cross-linking promotor used in this invention includes, for example, triallyl cyanurate, triallyl iso cyanurate, trimethylol propane triacrylate, trimethylol propane trimethacrylate, polycaprolactone, ethylene glycol dimethacrylate, diethylene glycol dimethacrylate, triethylene glycol dimethacrylate, polyethylene glycol dimethacrylate. The additon of these cross-linking promotors varies with the composition or the dose of an ionizing radiation. The addition is normally chosen to range from 0.5 to 20 or preferably 1 to 10 PHR.

An ionizing radiation used in this invention includes, for example, γ ray, β ray, neutron, and electron beam generated by an accelerator. The ionizing radiation is desired to be emitted to such an extent that the absorbed dose ranges from 0.5 to 20, or preferably 1 to 12 Mrad.

The degree with which the shaped polyvinyl chloride resin is cross-linked varies with the physical properties of the intended foam, the kind of polyvinyl chloride resin, the kind and added amount of a plasticizer, and the kind and added amount of a cross-linking promotor. However, the degree of cross-linking is preferred to range from 20 to 60% as measured from the gel content. The lower gel content than 20% has the drawbacks that where the cross-linked shaped polyvinyl chloride resin is thermally foamed while being held on a support such as a metal net conveyor, then the produced foam sticks to the support; the pattern of the metal net, for example, is transferred on to the surface of the foam; and the produced foam is reduced in the subsequent thermal moldability. Conversely, the higher gel content than 60% gives rise to the difficulties that the resultant foam loses a commerical value because it is changed into the type comprising large irregular-shaped void space whose diameter is scores or hundreds of times larger than that of cell formed in a normal foamed article, that is, a foamed mass containing void spaces resulting from parts of lacked cellular structure. Therefore, the degree of cross-linking is preferred to range from 25 to 55% as measured from the gel content.

As used herein, the value of the term "gel content" is determined by cutting up a cross-linked shaped or foamed polyvinyl chloride resin into small chips each measuring 1 mm$^3$, heating the cut chips at a temperature of 100° C. for 24 hours in cyclohexanone, and determining the percentage proportion of the weight of the retained insoluble matter to that of the initial whole body.

According to the method of this invention, cross-linked polyvinyl chloride resin shaped into, for example, a sheet is thermally foamed. The foaming is carried out generally at a temperature ranging from 170 to 250 or preferably 180° to 240° C. In this case, no limitation is imposed on this thermal foaming process. However, the preferred foaming process normally comprises setting the shaped polyvinyl chloride resin on a metal net, blowing hot air from above and below the shaped mass for uniform heating the foam said shaped mass. While sliding along the surface of the metal net, the foamed mass substantially uniformly expands in the directions of the length, width and thickness. The foamed mass according to this invention has a density of less than 0.3 g/cm$^3$ and is formed of uniformly fine cells whose average diameter is smaller than 500 microns.

No limitation is imposed on the size of the foamed mass. Namely, the mass may have any thickness, provided it can be cross-linked by emission of a radiation. However, the foamed mass is generally preferred to have a thickness ranging from 0.5 to 10 mm.

Further, the polyvinyl chloride resin may be mixed with less than 100 PHR of a filler such as clacium carbonate, magnesium carbontate, magnesium oxide, aluminium hydroxide, talc or anitmony trioxide.

A second embodiment of manufacturing method of this invention is as follows. As previously described, it has been found that where a thermally decomposable blowing agent is heated when it is added with a stabilizer, then said blowing agent vigorously decomposes itself even at a lower level than the normal decomposition temperature thereof. A method of manufacturing a cross-linked polyvinyl chloride resin foam according to one embodiment of this invention have been accomplished from this finding. However, the following fact has been found from further studies.

Namely, a large number of stabilizers have already been known for the polyvinyl chloride resin. It has been disclosed that addition of a thermally decomposable blowing agent with a tin series stabilizer does not appreciably reduce the decomposition temperature of said blowing agent. Therefore, it is possible to mix the polyvinyl chloride resin with not only the tin series stabilizer but also other additives such as a plasticizer, blowing agent, and cross-linking promotor at the same time, and knead and shape the mixture at a higher level than the gelling temperature of the polyvinyl chloride resin.

It has been further found that a lead series stabilizer which tends to reduce the decomposition temperature of a blowing agent to the greatest extent does not indicate said tendency noticeably, if it is added in a smaller amount than 0.5 PHR, and that a polyvinyl chloride resin retains a full thermal stability, if said lead series stabilizer is added in such a small amount.

Therefore, a method of manufacturing a cross-linked vinyl chloride resin foam according to a second embodiment of this invention comprises:

a first step of mixing polyvinyl chloride resin, plasticizer having a lower vapor pressure than 1.0 mm Hg at 200° C., more than 0.5 PHR of a tin series stabilizer or less than 0.5 PHR of a lead series stabilizer, cross-linking promotor and blowing agent of azodicarbonamide at the temperature at which the blowing agent does not decompose itself and yet the polyvinyl chloride resin is gelled, and in shaping the mixed gelled mass into a sheet by an extruder or calender roll at a temperature which does not give rise to the decomposition of a blowing agent;

a second step of exposing the shaped sheet to an ionizing radiation for cross-linking; and a third step of thermally foaming the cross-linked mass.

The polyvinyl chloride resin and cross-linking promotor used in the manufacture of a cross-linked polyvinyl chloride resin foam according to the second embodiment of this invention are of the same type as those applied in the aforementioned first embodiment.

The blowing agent used in the second embodiment is azodicarbonamide. The reason is that in the second embodiment the polyvinyl chloride resin is mixed with the blowing agent, and the mixture is kneaded at a higher level than the gelling temperature of the polyvinyl chloride resin, making it necessary to apply a blowing agent having a higher decomposition temperature than the gelling temperature of said polyvinyl chloride resin. Most preferred for practical application is azodicarbonamide which evolves a large amount of gas and is free from the danger of explosion. The addition of the blowing agent varies with the density of an intended foam of polyvinyl chloride resin, but is generally chosen to range from 3 to 30 PHR.

A plasticizer used in the second embodiment should be the type whose vapor pressure is lower than 1.0 mm Hg at 200° C. The reson is that the second embodiment applies a blowing agent of azodicarbonamide having a high decomposition temperature, causing foaming to be carried out at as high a temperature as 190° to 250° C., and it is necessary to apply a plasticizer having a lower vapor pressure than 1.0 mm Hg in order to prevent said plasticizer from being evaporated. The plasticizer includes, for example, phthalate esters such as diisodecyl phtalate (DIDP), n-didecyl phtalate (nDDP), ditridecyl phtalate (DTDP), diisolauryl phtalate (DILP) and dilauryl phtalate (DLP); trimellitate esters such as trioctyl trimellitate (TOTM), and tridecyl trimellitate (TDTM); phosphate esters such as tricresyl phosphate (TCP); epoxy series such as epoxidized soyabean oil (ESBO); polyester series such as adipic acid polyester or azelaic acid polyester having a larger molecular weight than about 1,000. Preferred is the plasticizer of the phtalate esters where addition is chosen to be larger than 30 PHR.

The tin series stabilizer includes, for example, organotin laurate series, organotin dimalate series, and organotin mercaptide series compound, whose addition is chosen to be larger than 0.5 PHR. Where any of these stabilizers is added in a smaller amount than 0.5 PHR, then the polyvinyl chloride resin foam can not have satisfactory thermal stability.

The lead series stabilizer includes, for example, tribasic lead sulfate, dibasic lead stearate, lead stearte, white lead, dibasic lead phthalate, dibasic lead phosphite, tribasic lead maleate, lead silicate, and coprecipitant of lead silicate and silica gel. The lead series stabilizer is very effective to reduce the decomposition temperature of the blowing agent of azodicarbonamide. If, however, the lead series stabilizer is added in a smaller amount than 0.5 PHR, then the decomposition temperature of azodicarbonamide is not appreciably reduced but can be retained at a higher level than the gelling temperature of the polyvinyl chloride resin. Therefore, the lead series stabilizer can render the polyvinyl chloride resin foam fully thermally stable.

It is known that two kinds of stabilizer, jointly used, generally prove very effective due to synergism to render the subject polyvinyl chloride resin foam thermally stable. Therefore, for the object of this invention, too, it is possible to jointly apply more than 0.5 PHR of the tin series stabilizer or less than 0.5 PHR of the lead series stabilizer, and a small amount of other stabilizers. Other stabilizers serving the purpose of this invention include, for example, barium soap series stabilizers, zinc soap series stabilizers and calcium soap series stabilizers.

The method of manufacturing a cross-linked polyvinyl chloride resin foam according to a second embodiment of this invention comprises a first step of blending polyvinyl chloride resin with the above-mentioned various additives at a temperature higher than the gelling temperature of said resin and lower than the decomposition temperature of the blowing agent of azodicarbonamide and shaping the blended mass into a sheet by an extruder or calender roll at the temperature at which said blowing agent is not decomposed; and a second step of emitting an ionizing radiation to the shaped sheet for cross-linking. However, this second step is carried out in exactly the same manner as the cross-linking process or second step of the first embodiment.

In the second embodiment, a third step of foaming following the cross-linking step is undertaken in substantially the same manner as the foaming step of the first embodiment. The foaming step of the second embodiment is only different from that of the first embodiment in that the foaming step of the first embodiment is generally taken at a higher temperature than 170° C., whereas the foaming step of the second embodiment is taken at a temperature ranging between 190° and 250° C. Where, in the second embodiment, foaming is carried out at a lower temperature than 190° C., then the foamed product expands at an extremely low rate. Conversely where foaming is carried out at a higher temperature than 250° C., then the undesirable event occurs that the polyvinyl chloride resin itself is prominently deteriorated, and the plasticizer is noticeably volatilized.

It is possible to apply a plastics film or one containing a very small amount of a blowing agent to one or both sides of a sheet shaped from the blended mass, for example, by a calender roll in the first step of the manufacturing method of this invention. Or it is possible to apply in the second step a cross-linked plastic film or a non-cross-linked plastic film to one or both sides of a cross-linked foamable shaped mass. A foamed product coated with such plastic film has an extremely smooth surface, and increases in mechanical strength. A colorless foamed product coated with such plastic film indicates prominent whiteness.

BEST MODE OF CARRYING OUT THE INVENTION

This invention will be better understood from the examples which follow. Throughout the example, the term "part" is defined to mean a part by weight.

EXAMPLES 1 TO 4

100 parts of polyvinyl chloride resin (manufactured by the Japan Zeon Co., Ltd with the trademark 103EP) were blended with 50 parts of dioctyl phtalate, 8 parts of tribase, 1 part of dibasic lead stearate, 20 parts of calcium carbonate, and 1 part of triallyl isocyanurate (Example 1), or 2 parts of the same (Example 2), or 3 parts of the same (Example 3), or 4 parts of the same (Example 4) by a roll at 165° C. until the blended mass is fully gelled. Later, 10 parts of azodicarbonamide was kneaded with the blended mass by a roll at 140° C. Later, the mass was shaped into a sheet having a thickness of 1 mm by a press at 150° C. The sheet was cross-linked by emitting electron beams with various doses indicated in Table 1 below. The cross-linked samples were set on a wire net. Hot air at 220° C. was blown on the samples for 5 minutes for foaming.

Determination was made of the properties of the cross-linked polyvinyl chloride foam samples thus produced, the results being set forth in Table 1 below.

TABLE 1

| Sample | Electron beam dose (Mrad) | Gel content (%) | Density (g/cm$^3$) | Cell diameter (micron meter) | Sticking of foamed mass to a metal net | Growth of void spaces |
|---|---|---|---|---|---|---|
| Example 1 | 10 | 28 | 0.12 | 400 | No | No |
|  | 12 | 35 | 0.13 | 300 | No | No |
| Example 2 | 8 | 30 | 0.12 | 400 | No | No |
|  | 10 | 41 | 0.13 | 300 | No | No |
| Example 3 | 7 | 34 | 0.11 | 400 | No | No |

TABLE 1-continued

| Sample | Electron beam dose (Mrad) | Gel content (%) | Density (g/cm³) | Cell diameter (micron meter) | Sticking of foamed mass to a metal net | Growth of void spaces |
| --- | --- | --- | --- | --- | --- | --- |
|  | 9 | 51 | 0.12 | 300 | No | No |
| Example 4 | 6 | 35 | 0.11 | 300 | No | No |
|  | 8 | 54 | 0.12 | 200 | No | No |

As seen from Table 1 above, the method of this invention can manufacture a cross-linked polyvinyl chloride resin foam free from void spaces with a low density without causing the foamed product to viscously stick to the wire net.

EXAMPLE 5

100 parts of polyvinyl chloride resin (manufactured by Japan Zeon Co., Ltd. with a trademark of 103EP-8) were kneaded with 60 parts of dioctyl phtalate, 8 parts of tribase, 1.2 parts of DBL, 20 parts of calcium carbonate and 4 parts of triallyl cyanurate by a roll at a temperature of 165° to 170° C. 15 parts of azodicarbonamide were kneaded with the above-mentioned mixture on a roll at 140° C. The knead mass was crushed, and thereafter extruded into a sheet having a width of 400 mm and a thickness of 1.5 mm by an extruder which had a diameter of 115 mm and was heated to 140° C. Applied to one side of the sheet was a film having a thickness of 0.2 mm which was obtained from the same mixture as the above-mentioned kneaded mixture except for azodicarbonamide. Therefore, electron beams were irradiated on the composite sheet with a dose of 7 Mrad. The electron beam-irradiated mass was thermally foamed on a stainless steel wire net of 45 mesh in an hot air furnace at 220° C.

A white sheet thus foamed had a density of 0.07 g/cm³, a width of 1,000 mm, a thickness of 4.5 mm and a smooth surface.

The foamed sheet was embossed while being heated by infrared rays, producing a beautiful embossed sheet.

EXAMPLES 6 TO 10

100 parts of polyvinyl chloride resin (manufactured by Japan Zeon Co., Ltd. with a trademark of 103EP) were blended with 30 parts of dioctyl phthalate (in Example 6), 40 parts of the same (in Example 7), 50 parts of the same (in Example 8), 60 parts of the same (in Example 9) or 70 parts of the same (in Example 10), 8 parts of tribase, 1 part of dibsic lead stearate, 20 parts of calcium carbonate and 5 parts of triallyl isocyanurate on a roll at 165° C. until the blended mass was fully gelled. 10 parts of azodicarbonamide were added to the kneaded mass on a roll at 135° C. The mixture was shaped into a sheet having a thickness of 1 mm by a press at 140° C. Electron beams where irradiated on the sheet with a dose of 7 Mrad for cross-linking. The electron beam-irradiated sheet was thermally foamed at a temperature of 200° C. for 8 minutes on a wire net. Determination was made of the properties of the foamed sheet, the results being set forth in Table 2 below.

TABLE 2

|  | Density (g/cm³) | Tensile strength (kg/cm²) | Elongation (%) | Compressive hardness (kg/cm³) | Fire retardancy |
| --- | --- | --- | --- | --- | --- |
| Example 6 | 0.060 | 9.85 | 75 | 1.55 | Self-extinguishable |
| Example 7 | 0.063 | 8.54 | 90 | 0.95 | Self-extinguishable |
| Example 8 | 0.067 | 7.25 | 120 | 0.65 | Self-extinguishable |
| Example 9 | 0.070 | 6.26 | 150 | 0.50 | Self-extinguishable |
| Example 10 | 0.075 | 5.50 | 185 | 0.38 | Self-extinguishable |

EXAMPLE 11

100 parts of polyvinyl chloride resin (manufactured by Japan Zeon Co., Ltd. with a trademark 103E-8) were blended with 60 parts of dioctyl phtalate, 20 parts of calcium carbonate, 7 parts of tribase, 1 part of dibutyl tin dilaurate, and 4 parts of ethylene glycol dimethacrylate by a roll at 170° C. in a fully gelled condition. After the roll temperature was reduced 135° C., azodicarbonamide was uniformly mixed with the blended mmass. The mixture which was drawn out in the form of a band was cut up into pellets. The pellets were extruded continuously for 2 hours by a 40 mm extruder of L/D 26 fitted with a T die having a width of 200 mm, thereby producing a sheet having a smooth surface and a thickness of 1.2 mm.

Electron beams were irradiated on the sheet with an absorbed dose of 10 Mrad. The sheet was continuously heated for foaming on a wire net in an hot air furnace at 200° C. Thus, it was possible to produce a satisfactory elongated sheet of cross-linked polyvinyl chloride resin foam which had an average cell diameter of 200 microns and a thickness 3 mm.

Control 1

The mixture used in Example 11 was kneaded for long hours by a roll at 135° C. The kneaded mass was drawn out in the form of a band, which was then cut up into pellets. The pellets were extruded into a sheet by the same extruder as used in Example 11 which was heated to 140° C. Therefore, this sheet was produced without causing the polyvinyl chloride resin to be gelled even once in the interior. The sheet had a smooth surface but had a low mechanical strength due to the presence of void spaces. Electron beams were irradiated on the sheet and thermally foamed. In this case, large void spaces appeared in the foamed mass, whose cells were coarse and irregular in size.

EXAMPLE 12

Pellets of the kneaded mixture obtained in Example 11 were heated by a roll at 140° C. The heated mass was formed into a 3-ply sheet having a total thickness of 1.2 mm (each ply measuring 0.4 mm) by an inverted L- shaped calender roll by applying the doubling process. As a result, a satisfactory sheet was obtained which had a smooth surface and was free from fine voids. This sheet was cross-linked and foamed by the same process as applied in Example 11, providing an elongate beautiful cross-linked polyvinyl chloride resin foam sheet which had a thickness of 3 mm and whose cells had a diameter of 250 microns on the average.

Control 2

100 parts of polyvinyl chloride resin (manufactured by Japan Zeon Co., Ltd. with a trademark 103E-8) were blended in the same manner as in Example with 60 parts of dioctylphtalate, 20 parts of calcium carbonate, 7 parts of tribase, 1 part of dibutyl tin dilaurate, 4 parts of ethylene glycol dimethacrylate and 10 parts of azodicarbonamide on a roll at 165° C. at the same time. Then the azodicarbonamide suddenly decomposed itself, causing the initially yellow mixture to be changed into a brown mass. This brown mass was not substantially foamed even when heated, proving that the blowing agent of azodicarbonamide almost decomposed itself when said yellow mixture was initially kneaded.

EXAMPLES 13 TO 16

100 parts of polyvinyl chloride resin (manufactured by Japan Zeon with a trademark 103EP) were mixed with 70 parts of dinormal decyl phthalate, 15 parts of azodicarbonamide, 10 parts of calcium carbonate, 5 parts of trimethylol propane trimethacrylate, 1 part of stearic acid, and 0.5 part of octyltin mercaptide (in Example 13), or 3 parts of said mercaptide (in Example 14), or 0.5 part of tribasic lead sulfate (in Example 15) or 0.2 part of said sulfate (in Example 16) in a Henschel mixer heated by steam having a vapor pressure of 1 kg/cm$^2$. The mixture was agitated for 4 minutes. Then the mixture was kneaded with pressure for 4 minutes in a Banbury mixer heated by steam having a vapor pressure of 2 kg/cm$^2$. Then the mass was immediately taken up on a mixing roll at 160° C. The kneaded masses of Example 13 to 16 were found to be fully gelled by said mixing roll.

The kneaded masses were each rolled into a sheet having a thickness of 0.5 mm by 4 inverted L-shaped calender rolls at 165° C. The sheets of Examples 13 to 16 all had a smooth surface and were free from fine voids. Electron beams were irradiated on each of these sheets by an accelerator with an absorbed dose of 10 Mrad. Each electron beam-irradiated sheet was heated for 90 seconds on a wire net in a hot air furnace at 220° C. The heated sheet did not stick to the wire net, providing a satisfactory cross-linked polyvinyl choride resin foam having the properties set forth in Table 3 below.

TABLE 3

|  | Density (gm/cm$^3$) | Average cell diameter (micron meters) | Discoloration in the surface | Volume of white smoke evolving at the time of foaming |
|---|---|---|---|---|
| Example 13 | 0.081 | 250 | Slightly colored | Small |
| Example 14 | 0.080 | 250 | None | Small |
| Example 15 | 0.078 | 200 | None | Small |
| Example 16 | 0.082 | 250 | Slightly colored | Small |

Controls 3 to 7

100 parts of polyvinyl chloride resin (manufactured by Japan Zeon Co., Ltd. with a trademark 103EP), 70 parts of dinormal decyl phthalate, 15 parts of azodicarbonamide, 10 parts of calcium carbonate, 5 parts of trimethylol propane trimethacrylate, 1 parts of steric acid, and 0.3 part of octyl tin mercuptide (in Control 3), or 1 part of tribasic lead sulfate (in Control 4), or 3 parts of calcium stearate (in Control 5), or 3 parts of barium laurate (in Control 6), or 2 parts of zinc stearate (in Control 7) were kneaded together in the same manner as in Examples 13 to 16. The mixture was shaped into a sheet on a calender roll. Electron beam were irradiated on the sheet for cross-linking. The cross-linked sheet was foamed, providing the product whose properties are set forth in Table 4 below.

TABLE 4

|  | Control 3 | Control 4 | Control 5 | Control 6 | Control 7 |
|---|---|---|---|---|---|
| Density (gm/cm$^3$) | 0.084 | — | 0.085 | 0.078 | — |
| Surface discoloration | Noticeable | — | Noticeable | Noticeable | — |

In Controls 4 and 7, the blowing agent vigorously decomposed itself, while evolving white fumes, immediately after the mixture was transferred from the Banbury mixer to the mixing roll. Therefore, the mixture could not be shaped into a sheet having a thickness of 0.5 mm. In Controls 3, 5 and 6, the sheets were each discolored into a brown mass and did not deserve to be called a satisfactory foam.

Control 8

A sheet was formed with a thickness of 0.5 mm by substantially the same process as in Example 14 by replacing 70 parts of dinormal decyl phtalate of Example 14 (having a vapor pressure of 0.2 mm Hg at 200° C.) with 70 parts of dibutyl phtalate (having a vapor pressur of 13.2 mm Hg at 200° C.). Electron beams were irradiated on the sheet with a dose of 10 Mrad. The electron beam-irradiated sheet was foamed in a hot air furnace at 220° C. A large volume of white fumes evolved from the plasticizer was drawn out from the outlet of the hot air furnace, failing to effect long continuous foaming. Further, a foam produced was reduced in flexibility and hardened.

Control 9, Examples 17, 18

The cross-linked sheet of Example 14 was foamed by hot air at 180° C. (in Control 9), or 190° C. (in Example 17), or 200° C. (in Example 18), providing foamed sheets shown in Table 5 below.

TABLE 5

|  | Control 9 | Example 17 | Example 18 |
|---|---|---|---|
| Hor air temperature | 180° C. | 190° C. | 200° C. |
| Density (g/cm$^3$) | 0.193 | 0.095 | 0.090 |

It is seen from Table 5 above that where a cross-linked polyvinyl chloride resin foam according to a second embodiment of this invention is manufactured, thermal foaming should be carried out at a higher temperature than 190° C., because the decomposition temperature of the blowing agent is not reduced.

Industrial Applicability

As described above, this invention can continuously manufacture at normal pressure a cross-linked polyvinyl chloride resin foam which has a low density, uniformly fine cells, excellent thermal moldability and high heat resistance, and is neither deformed nor deteriorated even by long storage. A cross-linked polyvinyl chloride resin foam manufactured by the invention is inexpensive, and released from the necessity of being limited to a particular application and rendered as widely acceptable as foamed polyurethane, foamed polystyrene and foamed polyethylene.

The cross-linked polyvinyl chloride resin foam manufactured by the invention has the above-mentioned satisfactory properties and is moreover possessed of fire retardancy originally characterizing polyvinyl chloride resin. Consequently, the foam product of the invention is adapted to be used as the internal furniture of an automobile and artificial leather, and further is widely applicable as a miscellaneous goods, structural and furniture material, sound absorbent, heat insulator, and shock absorbent.

We claim:

1. A method of continuously manufacturing a cross-linked polyvinyl chloride resin foam sheet which comprises:
    a first step of mixing polyvinyl chloride resin with a plasticizer, a stabilizer, a cross-linking promoter and a blowing agent comprising substep (a) mixing said polyvinyl chloride resin, said plasticizer and said stabilizer at the gelling temperature of the resin to form a gelated mixture and substep (b) thereafter adding and uniformly admixing a blowing agent to the gelated mixture at a temperature at which said blowing agent does not decompose, and adding said cross-linking promoter so that it is mixed with said polyvinyl chloride resin, plasticizer and stabilizer in substep (a) or is added after said gelated mixture has been formed and admixed in said substep (b), and continuously forming the gelated mixture into a sheet by extruder or calender roll at a temperature at which said blowing agent does not decompose;
    a second step of irradiating said sheet with ionizing radiation; and
    a third step of thermally foaming the cross-linked sheet to continuously form said foamed sheet.

2. The method of manufacturing the cross-linked polyvinyl chloride resin sheet according to claim 1, wherein in the first step the polyvinyl chloride resin, plasticizer, stabilizer and cross-linking promoter are mixed at the gelling temperature of the polyvinyl chloride resin in substep (a) and then the blowing agent is added to the mixture in substep (b).

3. A method of continuously manufacturing a cross-linked polyvinyl chloride resin foam which comprises:
    a first step of mixing and gelating polyvinyl chloride resin, a plasticizer having a vapor pressure lower than 1.0 mm Hg at 200° C., a stabilizer selected from the group consisting of (i) a tin series stabilizer in an amount of more than 0.5 PHR and (ii) a lead series stabilizer in an amount less than 0.5 PHR, a cross-linking promoter and azodicarbonamide as the blowing agent at a temperature at which the azodicarbonamide does not decompose at which the resin gels to form a gelated mixture, and continuously forming the gelated mixture into a sheet by an extruder or calender roll at a temperature at which the azodicarbonamide does not decompose;
    a second step of irradiating said sheet with ionizing radiation to cross-link said sheet; and
    a third step of thermally foaming the cross-linked sheet to continuously manufacture said foamed sheet.

4. The method of manufacturing the cross-linked polyvinyl chloride resin sheet according to claim 1, wherein in the first step said cross-linking promoter and blowing agent are added to said mixture in substep (b).

5. The method of manufacturing the cross-linked polyvinyl chloride resin sheet according to claim 3, wherein said stabilizer is a tin series stabilizer selected from the group consisting of organotin laurate, organotin maleate and organotin mercaptide.

6. The method of manufacturing the cross-linked polyvinyl chloride resin sheet according to claim 3, wherein said stabilizer is a tin series stabilizer which is used jointly with any other stabilizer than a lead series stabilizer.

7. The method of manufacturing the cross-linked polyvinyl chloride resin sheet according to claim 3, wherein said stabilizer is a lead series stabilizer selected from the group consisting of tribasic lead sulfate, dibasic lead stearate, lead stearate, lead white, dibasic lead phosphite, dibasic lead phthalate, tribasic lead maleate, lead silicate, and co-precipitant of lead silicate and silica gel.

8. The method of manufacturing the cross-linked polyvinyl chloride resin sheet according to claim 3, wherein said stabilizer is a lead series stabilizer which is jointly used with any other stabilizer.

9. The method of manufacturing the cross-linked polyvinyl chloride resin sheet according to claim 1, which is characterized in that the polyvinyl chloride resin is a resin selected from the group consisting of vinyl chloride homopolymer, and vinyl chloride copolymer containing more than 50% by weight of vinyl chloride.

10. The method of manufacturing the cross-linked polyvinyl chloride resin sheet according to claim 1, which is characterized in that a compound selected from the group consisting of phthalate esters, phosphate esters, epoxidized vegetable oil, nitrile series synthetic rubber and chlorinated paraffin, is used in an amount of 20 to 120 PHR as the plasticizer.

11. The method of manufacturing the cross-linked polyvinyl chloride resin sheet according to claim 3, which is characterized in that a compound selected from the group consisting of diisodecyl phthalate, n-didecyl phthalate, ditridecyl phthalate, diisolauryl phthalate, dilauryl phthalate, trioctyl trimellitate, tridecyl trimellitate, tricresyl phosphate, epoxidized soyabean oil, and adipic acid or azelaic acid series polyesters having a molecular weight of more than about 1,000 is used in an amount of more than 30 PHR as the plasticizer.

12. The method of manufacturing the cross-linked polyvinyl chloride resin sheet according to claim 1, which is characterized in that a compound selected from the group consisting of triallyl cyanurate, triallyl isocyanurate, trimethylol propane triacrylate, trimethylol propane trimethacrylate, ethylene glycol dimethacrylate, diethylene glycol dimethacrylate, triethylene glycol dimethacrylate and polyethylene glycol dimethacrylate is used in an amount of 0.5 to 20 PHR as the cross-linking promoter.

* * * * *